(12) United States Patent
Moore et al.

(10) Patent No.: US 7,437,566 B2
(45) Date of Patent: Oct. 14, 2008

(54) SYSTEM AND METHOD FOR IDENTITY CONFIRMATION OF A CONTACT PUBLISHED ON A NETWORK

(75) Inventors: Kevin R. Moore, Seattle, WA (US);
Peyman Oreizy, Kirkland, WA (US);
Sean O. Blagsvedt, Seattle, WA (US);
Arvind Kumar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 689 days.

(21) Appl. No.: 10/837,131

(22) Filed: May 1, 2004

(65) Prior Publication Data

US 2005/0246544 A1 Nov. 3, 2005

(51) Int. Cl.
*G06F 9/00* (2006.01)
(52) U.S. Cl. .................. 713/182; 713/183; 713/185; 713/193; 713/178
(58) Field of Classification Search ................ 713/182, 713/183, 185, 193, 178
See application file for complete search history.

(56) References Cited

U.S. PATENT DOCUMENTS 6,148,328 A   11/2000   Cuomo et al. ............... 709/204
6,700,967 B2   3/2004   Klemoder et al. ........ 379/201.1
2003/0052915 A1   3/2003   Brown et al. ................ 345/752
2003/0217142 A1   11/2003   Bobde et al. ................ 709/224

OTHER PUBLICATIONS

R. Younglove, "Public Key Infrastructure, How It Works", Computing and Control Engineering Journal, vol. 12, No. 2, pp. 99-102, Apr. 2001.
J. Wullert II et al., "Presence Management in Next Generation Networks", Proceedings of SPIE, vol. 4522, pp. 69-75, Aug. 21, 2001.
M. Debbabi et al., "Standard SIP-Based Instant Messaging and Presence APIs for Networked Devices", 5th IEEE International Workshop on Networked Appliances, pp. 59-64, Oct. 30-31, 2002.
D. Greenfield, "All Present and Accounted For?", Network Magazine, vol. 18, No. 6, pp. 26-29, Jun. 2003.
S. Vaughan-Nichols, "Presence Technology: More than Just Instant Messaging", IEEE Computer Society, vol. 36, No. 10, pp. 11-13, Oct. 2003.

*Primary Examiner*—Thomas R Peeso
(74) *Attorney, Agent, or Firm*—Merchant & Gould; Timothy P. Sullivan

(57) ABSTRACT

A system and method is provided for confirmation of the identity of a contact on the network. A notification that a nearby user is present on a network is signed with a private key associated with the nearby user. The private key is also associated with a public key. A local user that has the nearby user's public key can verify the signature on the notification and confirm that the nearby user is the source of the notification. The verification of identity of the nearby user allows rich content previously stored for the nearby user to be displayed along with the nearby user's presence information.

24 Claims, 9 Drawing Sheets

SYSTEM AND METHOD FOR IDENTITY CONFIRMATION OF A CONTACT PUBLISHED ON A NETWORK

CROSS-REFERENCE TO RELATED APPLICATIONS

The present invention is related to patent applications entitled: "System and Method for a User Interface Directed to Discovering and Publishing Presence Information on a Network", U.S. application Ser. No. 10/837,349; "System and Method for a Synchronizing Between a File System and Presence of Contacts on a Network", U.S. application Ser. No. 10/837,099; and "System and Method for Discovering and Publishing of Presence Information on a Network", U.S. application Ser. No. 10/836,566, filed concurrently with this application. The related applications are assigned to the assignee of the present patent application and are hereby incorporated by reference.

BACKGROUND OF THE INVENTION

The concept of presence has increasingly come to the foreground of networking applications and real-time communications. Presence often refers to the ability to detect whether a user is online and available. One example of an application that takes advantage of presence information is an Instant Messenger (IM) program. An IM program provides a method for a user to send instant messages to other IM users on the Internet or on a network. IM is a type of communications service that enables a user to create a kind of private chat room with another individual in order to communicate in real time over the Internet. IM is analogous to a telephone conversation, but uses text-based, not voice-based, communication. Typically, the instant messaging system alerts a user whenever somebody on the user's private list is online. The user may then initiate a chat session with that particular individual.

However, presence for IM and other similar applications has been limited to presence information that is directly associated with a contact already established by the user. Presence of other users outside of the user's listed contacts has be unobtainable. Other applications have allowed for discovery of what devices are on a network, but not of the users. Along with the lack of solutions for discovery of users, a problem arises in determining whether the identity of a user on the network is authentic.

SUMMARY OF THE INVENTION

The present invention is generally directed towards providing a system and method for confirming the identity of a contact published on a network. The identity of a nearby contact on the network is verified according to public key encryption. A local user receives a notification that a nearby user is present on the network. If the nearby user has signed the notification with a private key signature, and the local user has the nearby user's public key, the local user may confirm that the nearby user is the source of the notification. In accordance with one aspect of the present invention, the notification is not encrypted, but merely makes use of the public key and private key signature for verification of identity.

In another aspect of the present invention, the identity of the nearby user may be verified against an existing entry in the local user's contacts folder. When the identity of a nearby user is match with an existing contact, rich content associated with the contacts folder (e.g., addresses, phone numbers, pictures, etc.) may be displayed to the local user along with the data denoting presence of the nearby user (e.g., display name, online status, sharing address, etc.).

In still another aspect of the present invention, a computer-implemented method is provided for identity confirmation of a nearby contact published on a network. The method includes receiving a key associated the nearby contact and discovering whether a presence published on the network is associated with the key. The key received from the nearby contact is then compared with the key associated with the presence published on the network to confirm that the identity of the presence is the nearby contact.

DETAILED DESCRIPTION

The present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
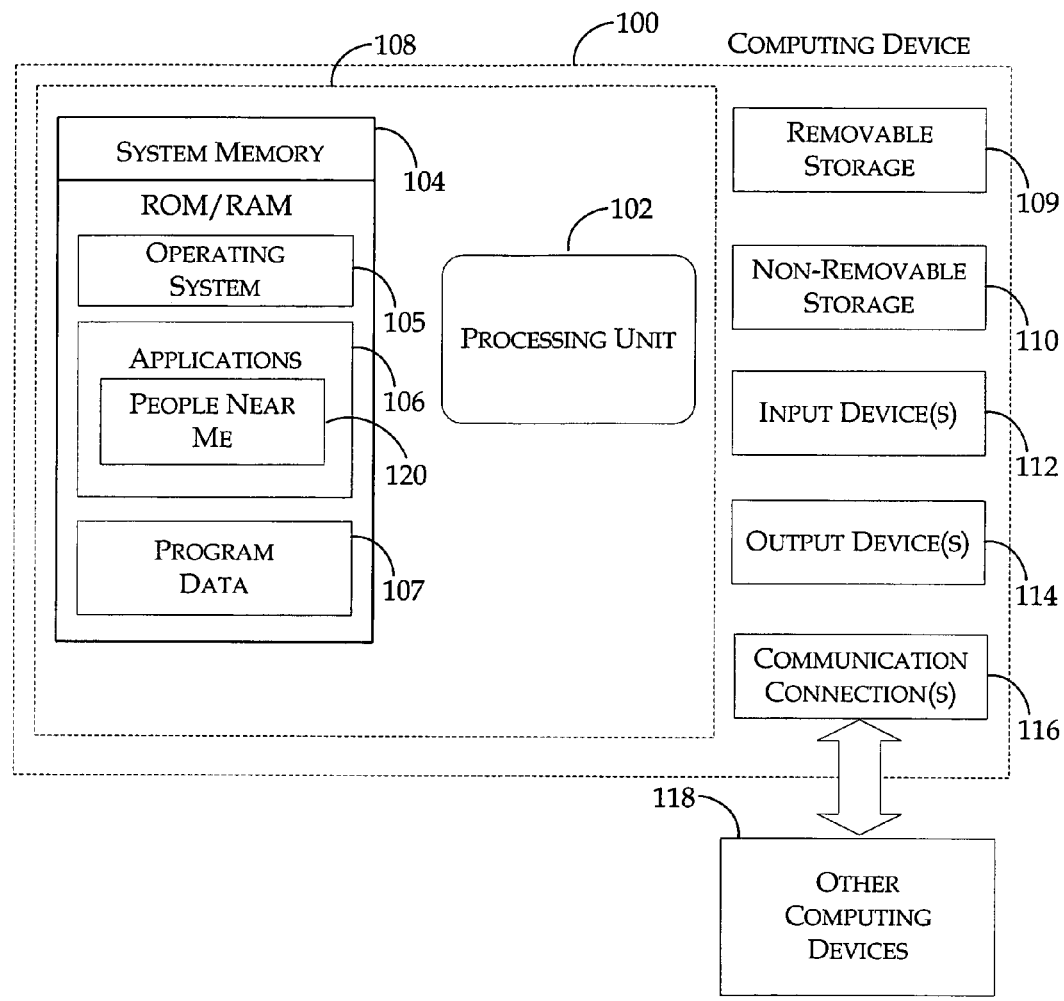
FIG. 1 illustrates an exemplary computing device that may be used according to exemplary embodiments of the present invention.

With reference to FIG. 1, one exemplary system for implementing the invention includes a computing device, such as computing device 100. Computing device 100 may be configured as a client, a server, mobile device, or any other computing device that provides for discovering and publishing presence information. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a people near me application 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
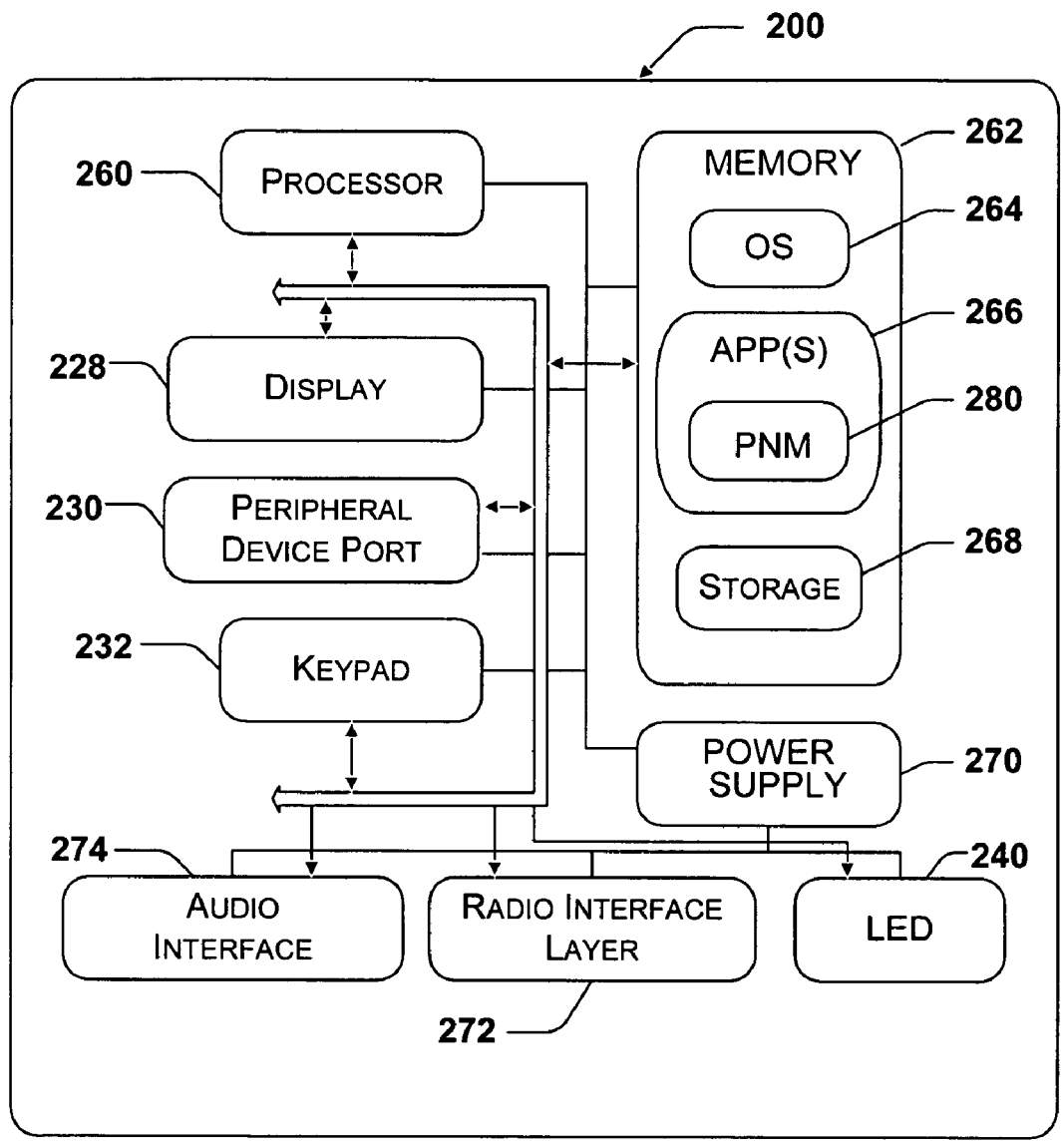
FIG. 2 shows an alternative operating environment for a mobile device substantially for use in the present invention.

FIG. 2 shows an alternative operating environment for a mobile device substantially for use in the present invention. In one embodiment of the present invention, mobile device 200 is integrated as a computing device, such as an integrated personal digital assistant (PDA) and wireless phone.

In this embodiment, mobile device 200 has a processor 260, a memory 262, a display 228, and a keypad 232. Memory 262 generally includes both volatile memory (e.g., RAM) and non-volatile memory (e.g., ROM, Flash Memory, or the like). Mobile device 200 includes an operating system 264, which is resident in memory 262 and executes on processor 260. Keypad 232 may be a push button numeric dialing pad (such as on a typical telephone), a multi-key keyboard (such as a conventional keyboard), or may not be included in the mobile device in deference to a touch screen or stylus. Display 228 may be a liquid crystal display, or any other type of display commonly used in mobile computing devices. Display 228 may be touch-sensitive, and would then also act as an input device.

One or more application programs 266 are loaded into memory 262 and run on operating system 264. Examples of application programs include phone dialer programs, e-mail programs, scheduling programs, PIM (personal information management) programs, word processing programs, spreadsheet programs, Internet browser programs, and so forth. In one embodiment, application programs 266 include a people near me (PNM) application 280. Mobile device 200 also includes non-volatile storage 268 within the memory 262. Non-volatile storage 268 may be used to store persistent information which should not be lost if mobile device 200 is powered down. The applications 266 may use and store information in storage 268, such as e-mail or other messages used by an e-mail application, contact information used by a PIM, appointment information used by a scheduling program, documents used by a word processing application, and the like. A synchronization application also resides on the mobile device and is programmed to interact with a corresponding synchronization application resident on a host computer to keep the information stored in the storage 268 synchronized with corresponding information stored at the host computer.

Mobile device 200 has a power supply 270, which may be implemented as one or more batteries. Power supply 270 might further include an external power source, such as an AC adapter or a powered docking cradle that supplements or recharges the batteries.

Mobile device 200 is also shown with two types of external notification mechanisms: an LED 240 and an audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile device 200 also includes a radio 272 that performs the function of transmitting and receiving radio frequency communications. Radio 272 facilitates wireless connectivity between the mobile device 200 and the outside world, via a communications carrier or service provider. Transmissions to and from the radio 272 are conducted under control of the operating system 264. In other words, communications received by the radio 272 may be disseminated to application programs 266 via the operating system 264, and vice versa.

The radio 272 allows the mobile device 200 to communicate with other computing devices, such as over a network. The radio 272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Presence Discovery and Publication System

The present invention generally provides a system for identity confirmation of a person published as nearby on a network. As used herein, the term "nearby" means people connected within either network or physical proximity to the user. For example, people who's devices are connected within the same local area network may be considered "nearby" to one another. Also, people who's devices are connected to the same network may be considered "nearby". Additionally, the users present on a link-local network may be considered "nearby". Alternatively, designation of physical location may also be included in the presence information such that people in the same room are those that are considered "nearby". The use of "nearby" in the present application is not limited to a single level of proximity, or require immediate closeness between the user and those people designated as "nearby". "Nearby" may be designated for any relationship between users based upon either physical or network location of the person or their associated device (e.g., computing device, mobile device, etc.).

Figure 3:
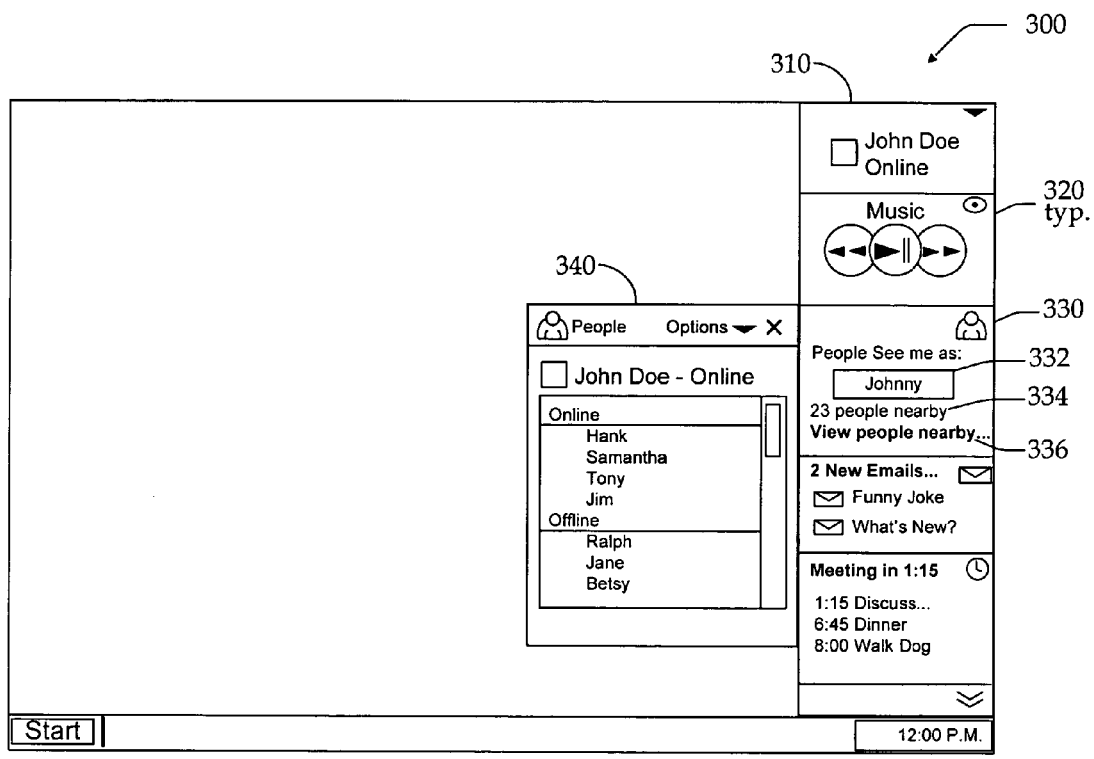
FIG. 3 illustrates an exemplary sidebar within a desktop.

FIG. 3 illustrates an exemplary sidebar within a desktop in accordance with the present invention. Sidebar 310 in desktop 300 includes tiles (e.g., 320) that provide a variety of information to the user during a computing session. For example, tiles within sidebar 310 may include media information, e-mail notifications, schedule notifications, as well as other information. Each tile may include icons and other content that differentiates the tiles from one another. Also included in accordance with the present invention, is PNM (people near me) sidebar tile 330, that peripherally and unobtrusively provides presence information to the user.

The exemplary PNM sidebar tile 330 includes an indicator of presence published by the user 332, notification of presence of other users 334, and selection to view more detailed presence information 336. In this example, indicator 332 provides the alias selected by the user that is published to other users on the network. Notification 334 provides a dynamically updated number of the users that are currently considered nearby to the user (e.g., 23 users are nearby). Selection 336 provides a link to more detailed information regarding the presence of other users on the network. For example, when a user selects selection 336, window 340 is opened to provide the user with the detailed information.

Window 340 provides the user with more detailed information of users nearby on the network. In one embodiment, the information within window 340 includes presence information along with contact information provided by a contacts application associated with the computing device. For example, detailed information in window 340 may include a differentiation of those contacts that are offline and those that are online. Other details of the users and contacts present on the network may also be provided through window 340. In one embodiment, window 340 is a "flyout" or window that is a component of the sidebar tile. In another embodiment, window 340 is produced by a contacts application and the PNM information is provided to the contacts application for inclusion within the contacts UI.

Figure 4:
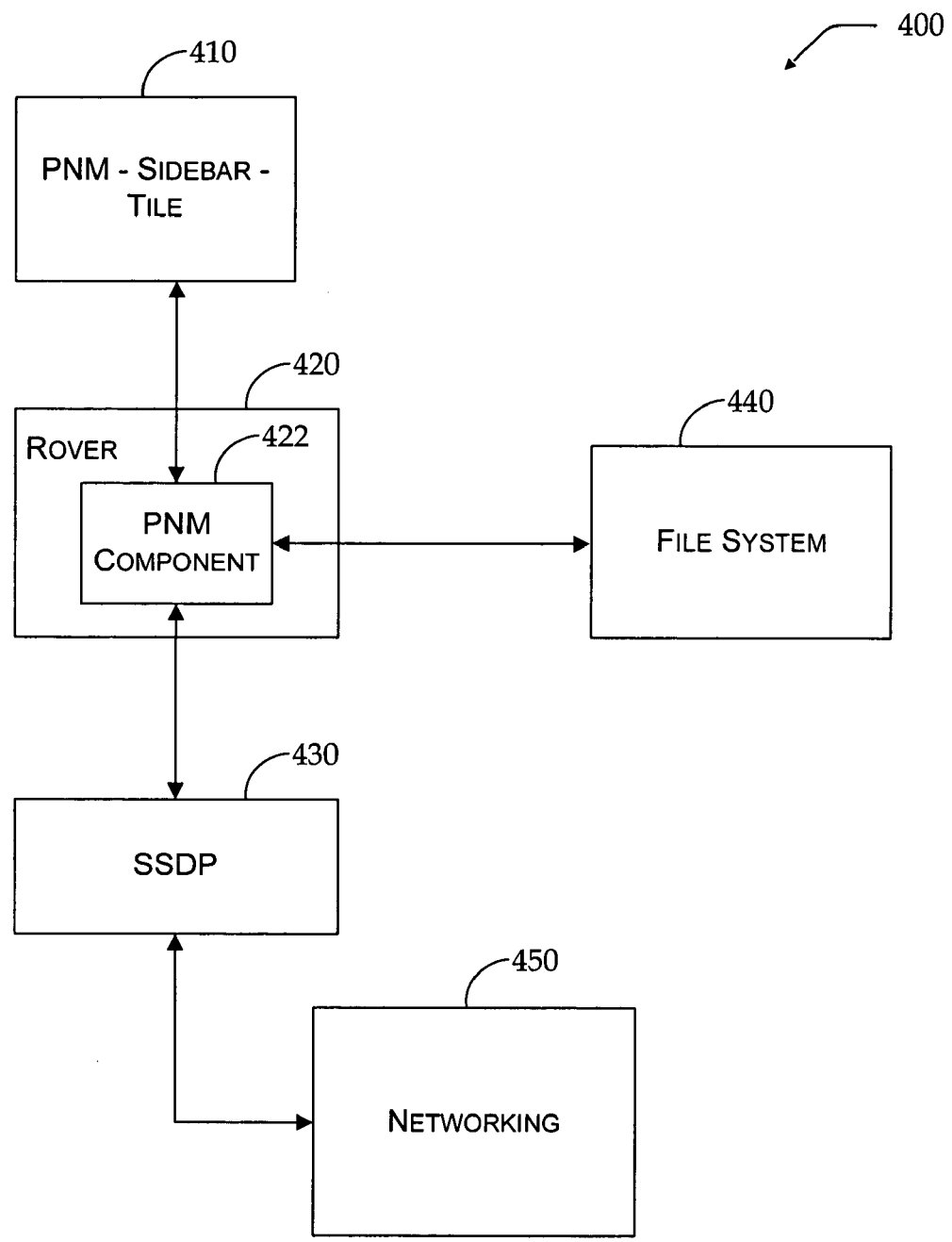
FIG. 4 illustrates a functional block diagram of a system for discovery and publication of nearby presence information on a network.

FIG. 4 illustrates a functional block diagram of a system for discovery and publication of nearby presence information on a network in accordance with the present invention. System 400 includes a PNM (people near me) sidebar tile 410 (see FIG. 3), a rover 420, SSDP (simple service discovery protocol) layer 430, file system 440, and networking layer 450. Rover 420 includes PNM component 422.

PNM sidebar tile 410 is a user interface that provides peripheral and unobtrusive notification to a user of those people considered nearby to the user. PNM sidebar tile 410 is described in greater detail with relation to the discussions of FIGS. 7 and 8 below.

SSDP layer 430 provides the protocol for discovering and publishing the presence information on the network. SSDP layer 430 is considered a subset protocol of a UPnP (universal plug and play) protocol for connectivity of devices on a network. UPnP is built on existing protocols and technologies. For example, UPNP uses TCP/IP, UDP/IP, and HTTP protocols as a base. In addition to these base protocols, several other protocols build on top of these to implement the various steps or phases of UPnP networking, such as SSDP. The form of the PNM messages transmitted and received according to SSDP layer 430 are described in greater detail with relation to FIG. 5 below.

File system 440 provides an extensible storage location for the information regarding the presence of people nearby to the user. In one embodiment, file system 440 is the WinFS file system created by Microsoft Corporation of Redmond, Wash. File system 440 is arranged to allow the PNM (people near me) information to be presented through more than one UI (user interface) and link the PNM information to other databases for their use. For example, file system 440 may include a contacts folder, where the user's contacts are stored. The PNM information may be used to indicate to the user which of the contacts listed is considered nearby to the user. Other relationships between the PNM information and other data may also be formed to provide distribution and use of the PNM information across multiple applications.

Networking layer 450 includes the drivers and access to the network for communication of the PNM information. The network may be the Internet or a private network. The user's presence is published via networking layer 450 while presence information of other is received through networking layer 450. The structure of networking layer 450 may be any structure that allows discovery and publication of presence information in accordance with the present invention.

PNM component 422 in rover 420 provides for coordination and communication between PNM sidebar tile 410, SSDP layer 430, and file system 440. PNM component 422 receives events through SSDP layer 430 indicating updates to the presence information on the network. PNM component 422 also receives changes selected by the user regarding publication of the user's presence and changes to the display of the presence information by PNM sidebar tile 410. PNM component 422 provides changes to the presence data within file system 440 in response to the changes from the PNM side bar tile 410 and SSDP layer 430.

Figure 5:
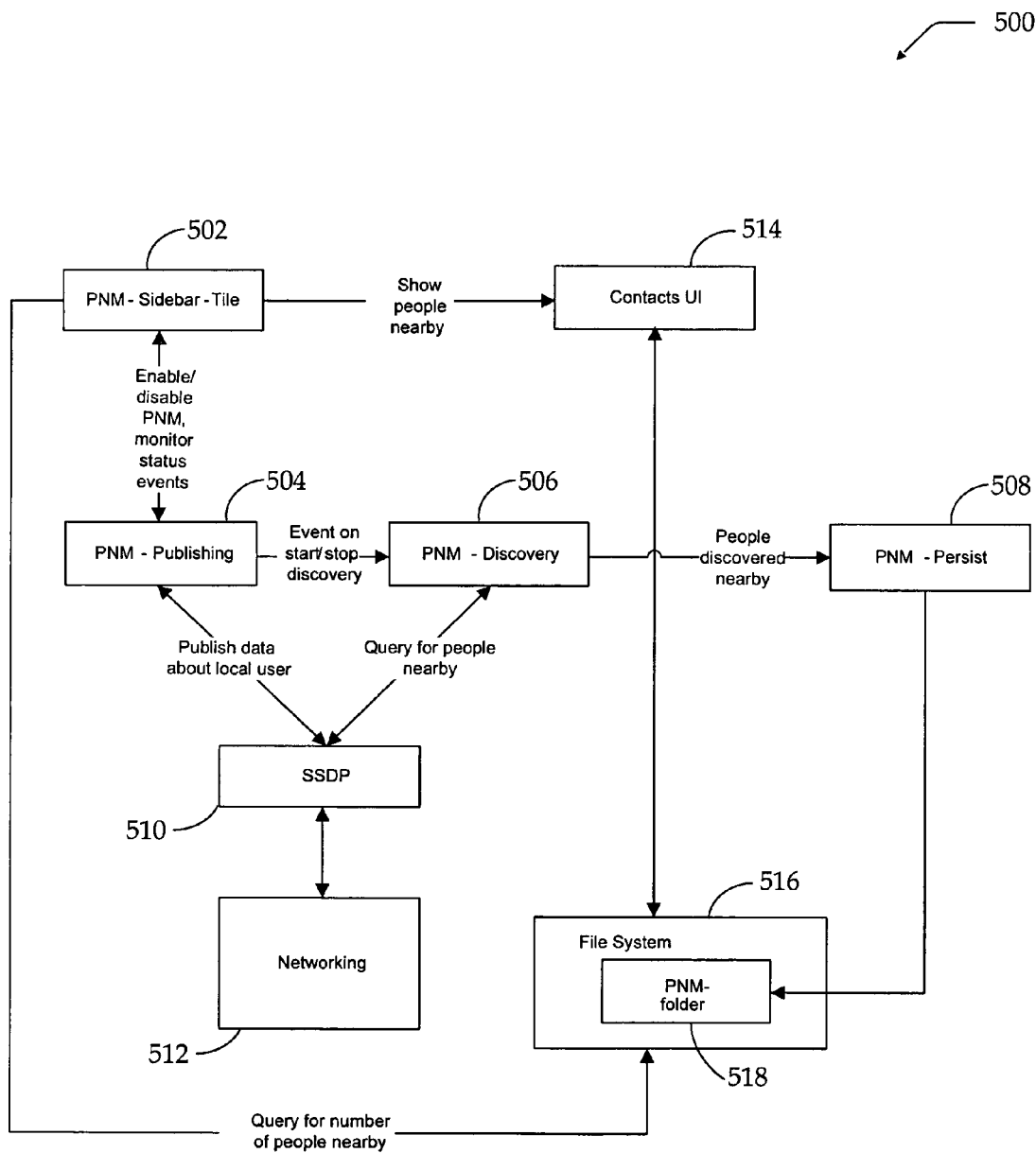
FIG. 5 illustrates another functional block diagram of a system for discovery and publication of nearby presence information on a network.

FIG. 5 illustrates another functional block diagram of a system for discovery and publication of nearby presence information on a network in accordance with the present invention. System 500 is similar to system 400 of FIG. 4 with greater detail shown with regard to the operation of the PNM (people near me) functionality. System 500 includes PNM sidebar tile 502, PNM publishing function 504, PNM discovery function 506, PNM persist function 508, SSDP layer 510, networking layer 512, contacts user interface 514, files system 516, and PNM folder 518.

PNM sidebar tile 502 is similar to PNM sidebar tile 410 shown in FIG. 4, and is used to allow the user to make changes to the PNM functionality and view the presence information provided by the PNM system. In the example shown, PNM sidebar tile 502 queries directly to file system 516 for the number of people nearby and the other information presented by PNM sidebar tile 502. In another embodiment, PNM sidebar tile 502 communicates with a user interface for a contacts application (e.g., contacts UI 514). The contacts user interface coordinates between PNM sidebar tile 502 and file system 516 to present the PNM information using contacts UI 514.

PNM publishing function 504 publishes the data about the local user on the network. SSDP layer 510 publishes the data as an alive packet that indicates that the local user is online, and the data includes information such as the user's display name. The alive packet indicates that the local user is present on the network and available. Additional information published in the alive packet includes a sharing address that resolves to the local user's machine address. In an additional embodiment, the alive packet may include identity verification data, such as a public key and/or private key, that allows a user to verify the identity of the user that is present on the network. A process for identity verification of people nearby is discussed in greater detail below with relation to the discussion of FIG. 9.

A "bye-bye" message is also published by SSDP layer 510 in response to the local user selecting to disable the PNM service. The bye-bye message refers to a notification provided to the network that the local user's presence on the network is discontinuing.

Additionally, other information related to the SSDP protocol is also published, such as a maximum lifetime property. The maximum lifetime property is included in the cache control header of the SSDP message and refers to the number of seconds that the PNM service of the local user is valid. In one instance, the maximum lifetime property is provided in case the PNM service ends suddenly, without a bye-bye message being published. The expiration of the maximum lifetime property notifies other users that a particular user's presence on the network has timed out, and the user is no longer present. A long as the local user maintains the PNM service as enabled, alive packets are continually published on the network that renew the maximum lifetime property such that indications of the local user's presence on the network is maintained.

Also published in the cache control header of the SSDP alive packet and bye-bye message is a service ID. The service ID uniquely identifies each of the users that are present on the network.

In an alternative embodiment, PNM publishing function 504 publishes only a portion of the data that is to be provided to nearby user's on the network in message or packet form. The remaining data is instead provided to a nearby user using a dedicated port established by the local user in response to a request by nearby user. Using these methods of communication in combination to provide data to nearby users reduces the size of the packets and increases their throughput speed on the network to update presence notifications more quickly.

Various events may also require that an alive packet be republished. For example, the user may select to change their display name. The alive packet is republished with the changed display name but the same service ID. Accordingly, users on the network know that the change is not a new PNM presence on the network, but the same presence with a new display name.

PNM discovery function 506 queries for the presence information related to other users nearby on the network for display to the local user. SSDP layer 510 receives the alive and bye-bye messages from the network and maintains a database of the users currently nearby. In response to events on the network (e.g., receipt of alive packet), SSDP layer 510 forwards the message corresponding to the event to PNM discovery function 506. In one embodiment, SSDP layer 510 also tracks the maximum lifetime property of each alive packet received and sends a notification to PNM discovery function 506 when the property expires. PNM discovery 506 forwards changes due to the events on the network to PNM persist function 508.

PNM persist function 508 provides instructions for changes to the data stored in file system 516 and PNM folder 518. In one embodiment, PNM folder 518 includes a list of the users that are nearby to the local user. PNM folder 518 may be linked with other folders in file system 516. Exemplary folder relationships between PNM folder 518 and other folders in file system 516 are described in FIG. 6 below.

The discussion throughout the specification and claims refers to "publishing presence information" and "publishing contacts". These phrases and their variances refer to providing retrievable information on the network about a user on the network. The published information may include the alive packet referred to above, the bye-bye message, identity information, general contacts information (e.g., phone numbers, address, etc.), and any other information related to an entity or device connected to the network.

Figure 6:
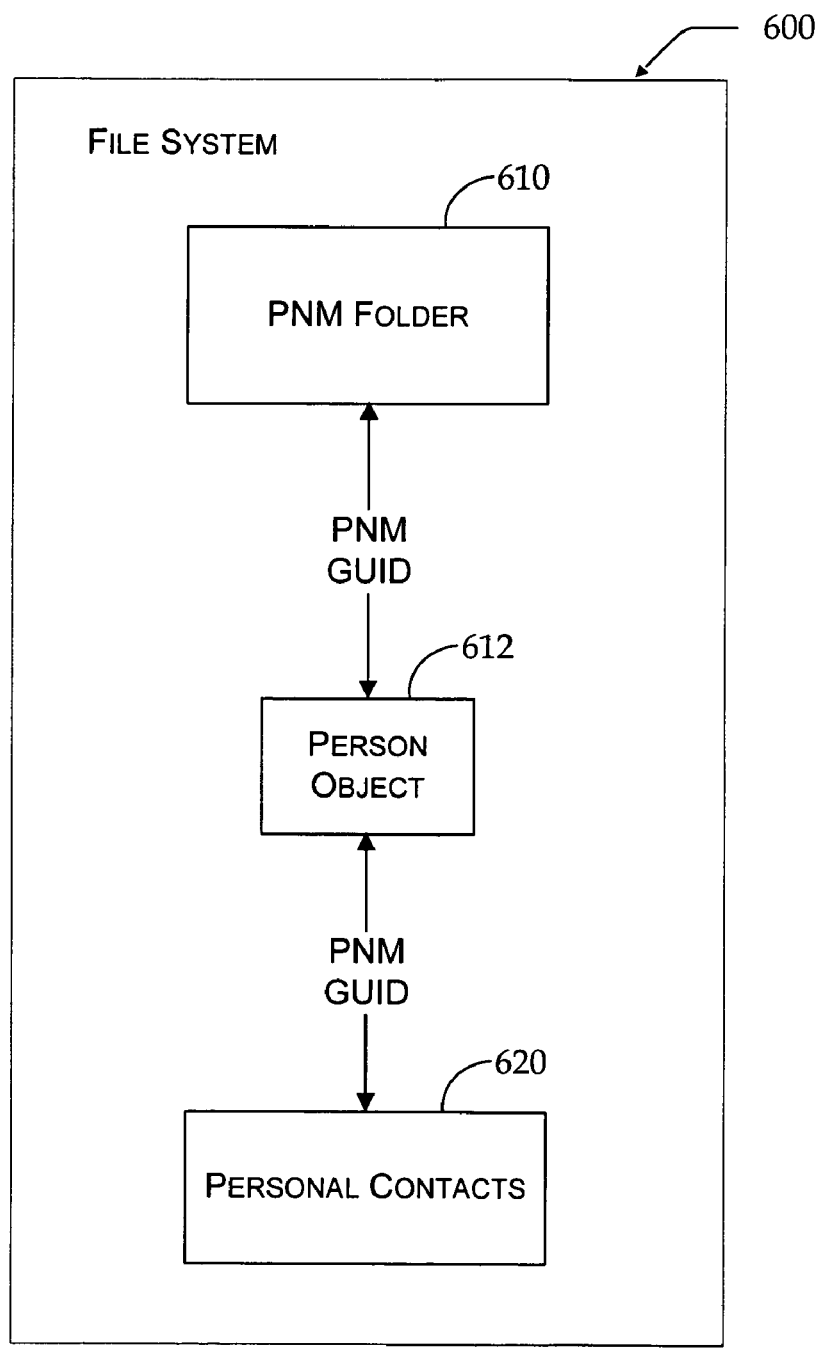
FIG. 6 illustrates exemplary file structures corresponding to a file system for storing presence information.

FIG. 6 illustrates exemplary file structures corresponding to a file system for storing presence information in accordance with the present invention. File system 600 includes PNM folder 610, person object 612, and personal contacts folder 620.

When the SSDP layer forwards an alive message to the PNM component of the rover (see FIG. 4), person object 612 is instantiated. Data from the alive message, such as the share address and display name, is populated into person object 612. In one embodiment, verification of the data in alive message is done before population into person object 612 to ensure authenticity of the data provided. Verification prevents unauthorized browser actions due to false addresses and storage of false entries within a local user's contacts.

In one embodiment, person object 612 is associated with PNM folder 610 as a contact entry. A local user may therefore open PNM folder 610 to view all the contact entries corresponding to other users nearby. Furthermore, a process may then count the number of entries within PNM folder 610 to provide a display of the number of people nearby to the local user.

In another embodiment, a relationship may be generated between the contact entries in personal contacts folder 620 and the contact entries in PNM folder 610. The relationship is generated when the alive message received has an associated identity verification. For example, public key encryption may have been used in conjunction with the alive message to verify the identity of the source of the alive message. The use of public key encryption with the PNM system is described in greater detail with respect to FIG. 9 below. When the identity of the user sending the alive message is verified as an existing entry in personal contacts folder 620, a link is generated to that entry rather than a new person object. Accordingly, the entry in PNM folder 610 includes rich content associated with personal contacts folder 620 (e.g., addresses, phone numbers, pictures, etc.) rather than the simple person object with the display name and sharing address. Additionally, the relationship is reciprocated with the entry in personal contacts folder 620, such that when the entry is opened in personal contacts folder 620 the presence information is shown (e.g., display name, online status, sharing address, etc.).

In yet another embodiment, a relationship is created between the person object 612 and personal contacts folder 620. With the relationship, the PNM contact entries are reflected within personal contacts folder 620, but remain identified as PNM contacts according to a PNM GUID (PNM global unique identifier). In one instance, the PNM GUID is identified according to a PNM designator that identifies all PNM entries combined with the service ID (see discussion of FIG. 5). Accordingly, the PNM GUID identifies a contact entry as a PNM contact, and distinguishes each PNM contact from one another. A process may then count the number of contact entries within personal contacts 620 that have an associated PNM GUID to display the number of people nearby. Furthermore, uniquely identifying the PNM entries allows personal contacts folder 620 to remove the PNM entries when the local user selects to disable the PNM service. File system 600 is therefore synchronizes with the presence of people nearby on the network, since personal contacts folder 620 may be updated as people move on and off the network and the local user enables and disables the PNM service.

Storing the PNM contacts as part of the local user's general (i.e., personal) contacts list also allows other applications to take advantage of the presence information for people nearby. For example, a general contacts user interface may be used to generally view the local user's list of contacts. By populating personal contacts folder 620 with the PNM contacts, the PNM contacts are reflected in the general contacts user interface. Other applications (e.g., contact picker dialogue) that access personal contacts folder 620 are also able to take advantage of the presence information and display people that are nearby on the network.

Figure 7:
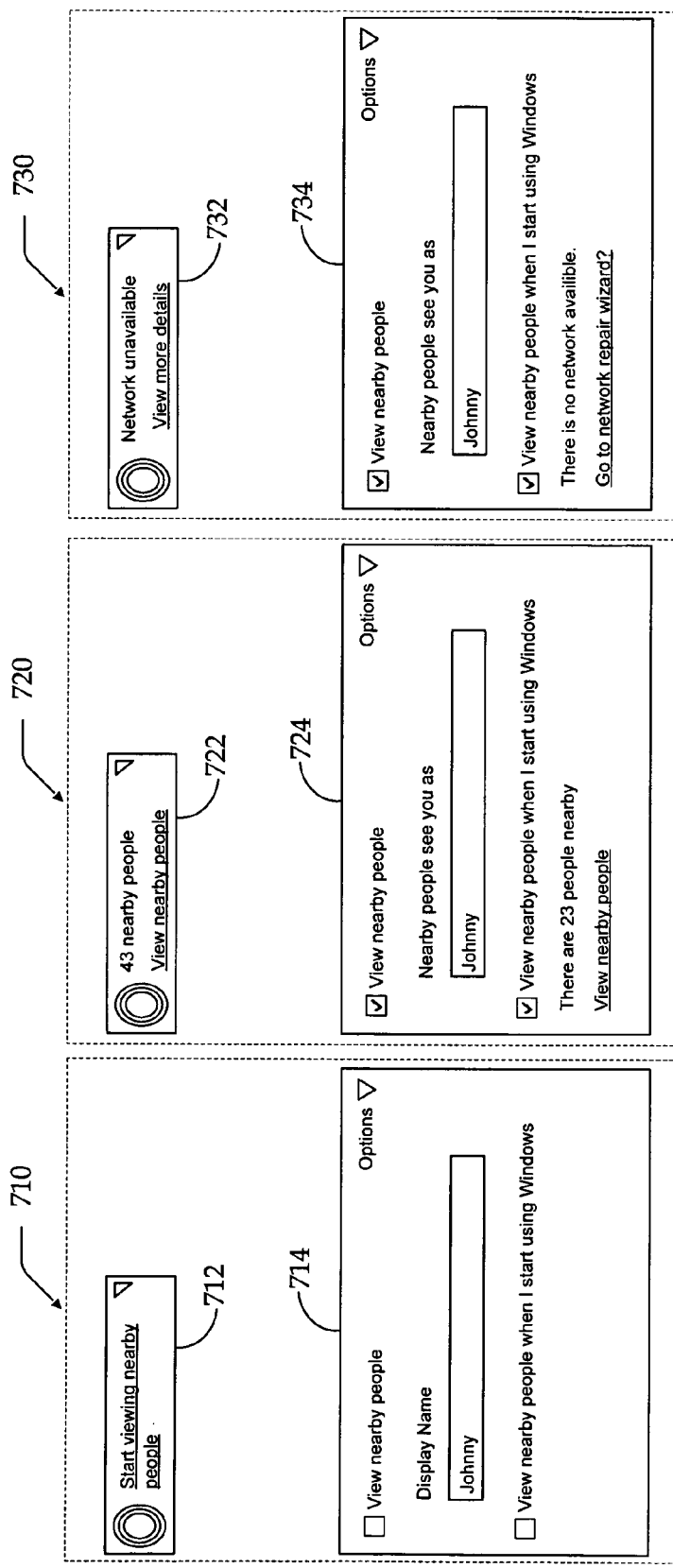
FIG. 7 illustrates exemplary sidebar tiles associated with publication and discovery of presence of nearby user's on a network.

FIG. 7 illustrates exemplary sidebar tiles associated with publication and discovery of presence of nearby users on a network in accordance with the present invention. Three tile scenarios are shown that provide for different sidebar tiles based upon the user selections and the state of the network. In each scenario a possible reduced view of the sidebar tile is provided (e.g., 712) along with a possible expanded view (e.g., 714). In another embodiment, each expanded view (e.g., 714) may be a flyout or separate window that is generated rather than within the sidebar itself.

Scenario 710 illustrates exemplary UI for when the PNM (people near me) service has yet to be enabled by the user. Reduced PNM sidebar tile 712 provides a selection to enable the service. Expanded PNM sidebar tile 714 provides further options regarding the display name the local user wants published and other options for configuring the PNM service.

Scenario 720 illustrates exemplary UI for when the PNM (people near me) service has been enabled by the user. Reduced PNM sidebar tile 722 provides an indication of the number of people nearby and also provides a selection to view more detailed information regarding the people nearby. Expanded PNM sidebar tile 724 provides further options regarding the display name the local user wants published and other options for configuring the PNM service and viewing more detailed presence information.

Scenario 730 illustrates exemplary UI for when the network is unavailable. Reduced PNM sidebar tile 732 provides a selection to view details of the network unavailability. Expanded PNM sidebar tile 734 provides the options for configuring the PNM service while also providing an option to troubleshoot the network failure.

Figure 8:
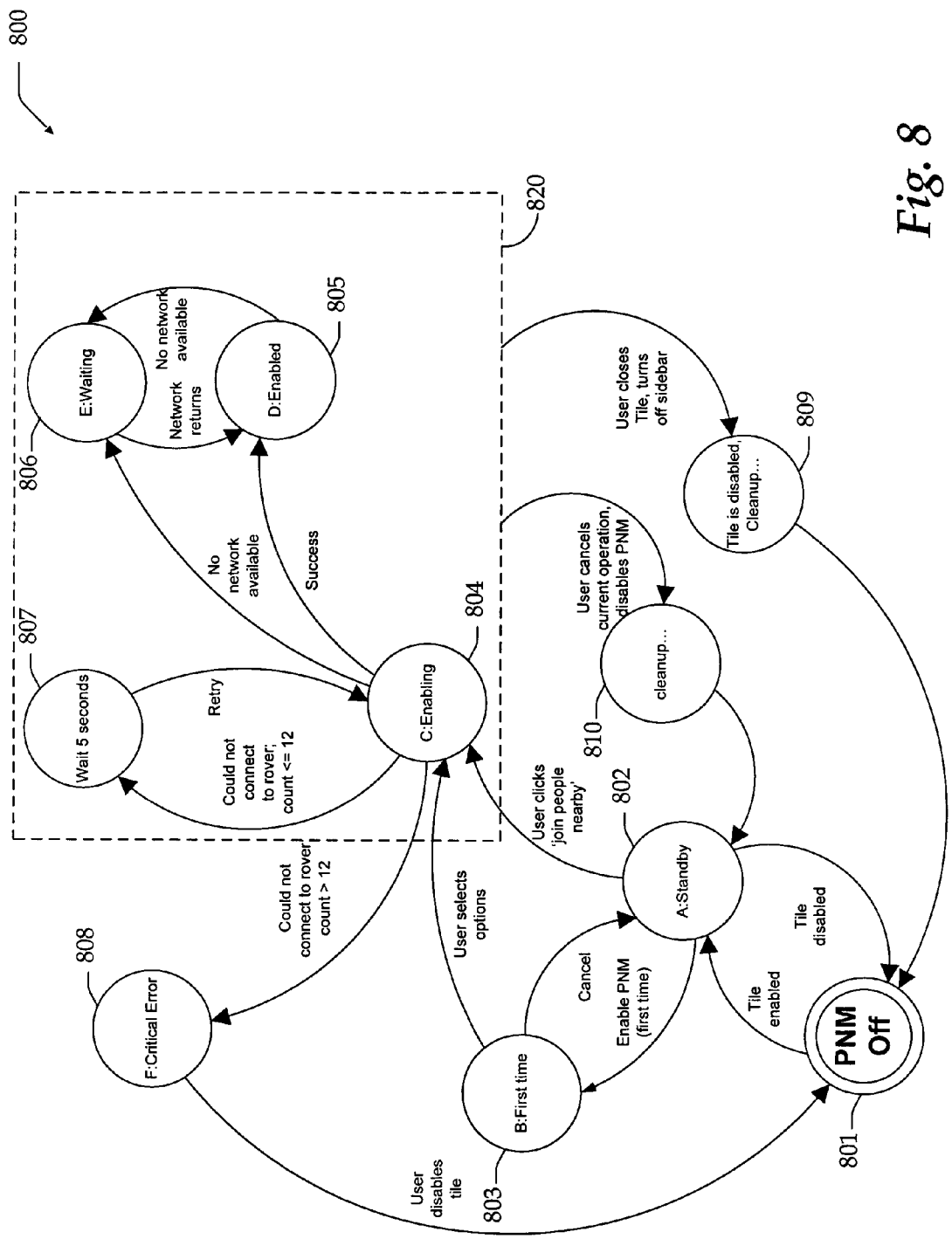
FIG. 8 illustrates an exemplary state table for implementing the user interface for the publication and discovery of presence information on the network.

FIG. 8 illustrates an exemplary state table for implementing the user interface for the publication and discovery of presence information on the network in accordance with the present invention. Finite state machine 800 includes ten states regarding the presentation of the PNM (people near me) user interface based upon the state of the PNM service.

Initially, the monitoring application of a mobile device is at a state 801, indicating that neither the PNM service nor the PNM sidebar tile are enabled and the bar tile is not visible. When the PNM sidebar tile is enabled, state machine 800 moves to a state 802.

At state 802, the PNM sidebar tile is in a standby mode awaiting further input from the local user. The input of the local user may be to disable the PNM sidebar tile. If the local user disables the PNM sidebar tile, state machine 800 moves back to state 801. In one embodiment, when the PNM sidebar tile is enabled for the first time (i.e., state 802 is reached from state 801), state machine 800 moves to state 803.

At state 803, a flyout or other external window is provided to the local user automatically, so that the local user may select initial options related to the PNM service (e.g., a display name). If the user chooses to cancel without selecting further options, state machine 800 reverts to state 802. However, if the user chooses to select options for the PNM service, state machine 800 advances to state 804.

In an alternative embodiment, state 803 is not included and the options are not provided. The local user may then select to enable the PNM service and the state moves directly from state 802 to state 804.

State 804 is included among the states (804, 805, 806, 807) that are within state region 820. State region 820 represents when the PNM service is being enabled or has been enabled. At state 804, the PNM service is being enabled. If the enabling process is successful, state machine 800 moves to state 805 where the PNM service is enabled and the people nearby are displayed to the user. However, if no network is found during the enabling process, state machine 800 moves to state 806.

At state 806, a waiting cycle is entered where the PNM system waits for the network to return. State 806 may also be reached from state 805 when a network failure occurs while the PNM service is enabled. When the network is again available, state machine 800 moves to state 805 where the PNM is enabled and displaying the people nearby.

While the PNM service is being enabled at state 804, a connection to the rover (see FIG. 4) may not be established. As previously described, the rover includes code for implementing the PNM service. If the rover is not reached after a specified count (e.g., 12 seconds), then state machine 800 moves from state 804 to state 807. At state 807, the enabling process waits 5 seconds and then returns to state 804 to retry a connection to the rover.

In certain circumstances, an error may occur during the enabling process that is critical enough to prevent the PNM service from operating correctly. When a critical error occurs, the state moves from state 804 to state 808. At state 808, the local is notified of the critical error and that the PNM service cannot proceed. The local user may then select to disable the PNM sidebar tile and state machine 800 moves back to state 801.

At any one of the states within state region 820, the user may select to cancel a current operation. Canceling the current operation, discontinues the enablement or disables the PNM service. With the PNM service disabled, state machine 800 moves back to state 802 where the PNM sidebar tile is in a standby mode awaiting further input from the local user.

Additionally, at any one of the states within state region 820, the user may select to close the PNM sidebar tile or the sidebar itself. If the user makes a selection to disable the PNM sidebar tile or the sidebar, state machine 800 moves to state 810. At state 810, the effected systems and folders (e.g., contacts folder) are cleaned up and the PNM sidebar tile is disabled, moving state machine 800 back to state 801. In one embodiment, when the system is cleaned up, the instances of PNM contacts and other PNM data are removed from the file system. Also, the SSDP layer (see FIG. 4) is instructed to discontinue publishing the local user's presence and discovering the presence information of other nearby user's on the network.

Figure 9:
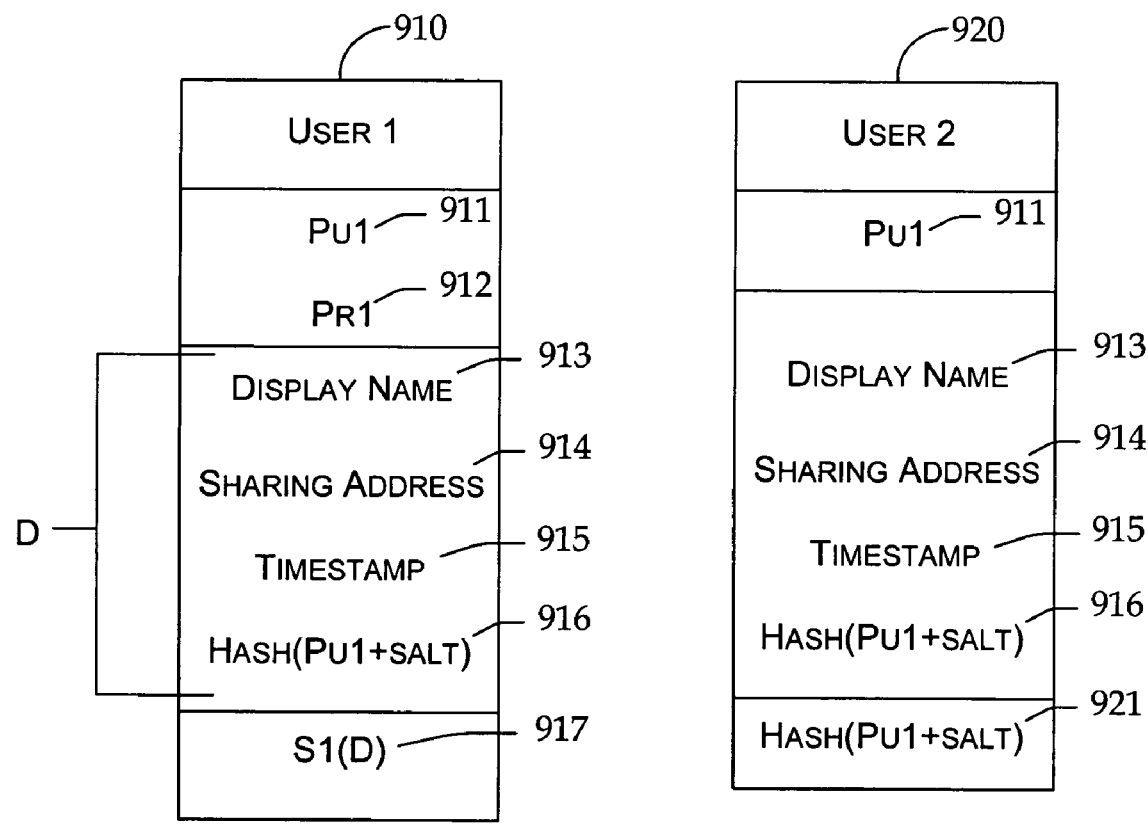
FIG. 9 illustrates exemplary identity verification with relation to a presence notification of a nearby user, in accordance with the present invention.

FIG. 9 illustrates exemplary identity verification with relation to a presence notification of a nearby user, in accordance with the present invention. For identity verification, user 1 has a set of elements 910 associated with a presence notification (i.e., alive packet). A public key (Pu1) 911 and private key (Pr1) 912 are associated with user 1. Data (D) is sent in the presence notification that includes display name 913, sharing address 914, timestamp 915, and hash(Pu1+salt) 916. Data (D) is signed with the private key (Pr1) 911 so that data (D) has an associated signature S1(D) 917.

Display Name 913 and sharing address 914 are optionally included in the presence notification to allow a local user to publish a name to nearby users that do not know the local user and to notify nearby user that the local user has shared information. Timestamp 915 is included to provide a interval of time that the signature S1(D) is valid. Hash(Pu1+salt) 916 is also optionally included. Hash(Pu1+salt) 916 is a hashed version of public key (Pu1) 911 along with an amount of random data referred to as "salt". The salt is also published in data (D) when salt is included in the hash. Hashing public key (Pu1) 911 ensures that a third party is not able to monitor the public keys as they are transferred between users. A third party viewing a hashed public key sees only random data that is not coherent as a public key. The addition of salt to hashed public key allows the public key to be further obfuscated and assists in preventing tracking of the public key. Hashing public key (Pu1) 911 also provides for narrowing down the identity of the user publishing data (D). Without the hashed public key, it may be necessary to try the public key of each contact to determine who signed data (D). With the published hashed public key, the contacts may first be queried for the contacts with a public key that hashes to match Hash(Pu1+salt) 916. Publishing Hash(Pu1+salt) 916 therefore allows the results to be narrowed, increasing the speed of the verification process. In other embodiments, public key (Pu1) 910 is not hashed or instead hashed without the salt (e.g., a random reordering of the public key bits).

When user 1 generates private key (Pr1) 912, public key (Pu1) 911 is also generated and associated with private key (Pr1) 912. User 1 is then able to send public key (Pu1) 911 to user 2. With the disseminated public key, user 1 is able to sign a set of data (e.g., D) with private key (Pr1) 912, such data includes signature S1(D) 917. Accordingly, only users that have public key (Pu1) 911 associated with user 1 (e.g., user 2) are able to view the data signed with private key (Pr1) 912 if the data was encrypted. Regardless of the encryption used, signature S1 (D) still proves that data (D) was not tampered with and that data (D) originated from user 1, thereby proving the identity of user 1. For example, with public key (Pu1) 911, user 2 is able generate an equivalent hash of the public key (e.g., Hash(Pu1+salt) 921) to compare with the original hash of the public key (e.g., Hash(Pu1+salt) 916). When the hashes match (and the data was encrypted), user 2 knows that display name 913, sharing address 914, and timestamp 915 indeed originated from user 1 rather than a malicious user.

Signature S1(D) 917 prevents a malicious user from attempting to republish the data published by user 1 on another network by changing sharing address 914. An attempted change to sharing address 914 breaks signature S1(D) 917 so that a user receiving the malicious rebroadcast is notified that data is not verified. Furthermore, the malicious user is prevented from resigning the data since they do not have private key (Pr1) 912.

Additionally, the inclusion of timestamp 915 causes signature S1(D) 917 to be valid for specified period of time. When the period of time expires, so does the identity verification. Timestamp 915 prevents malicious users from rebroadcasting the data without changes once a particular period of time has passed. Other users receiving this data once the period of time has expired simply ignore the data since timestamp 915 has expired.

In one embodiment of the present invention, the data transferred corresponding to the presence of user 1 nearby on the network is not encrypted even though public key infrastructure (PKI) is used. Instead, the use of public and private keys is limited to verification of the identity of a user as the source of the data. The data sent is written in plain text and therefore viewable, but the public key encryption verifies the identity of the user for which that data is published.

As stated previously with relation to FIG. 6 above, once the identity of the user publishing the data is verified as an existing contact, a richer data set may be provided to the user, improving the display of the PNM information to the user.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for identity confirmation of a user on a network, comprising:
receiving a presence notification of a user that indicates that the user is nearby on the network and is available; wherein the presence notification includes data that comprises a display name for the user; a sharing address for the user that resolves to a local machine address for the user; a timestamp; and a hash of a public key that is used to verify the identify of the user; wherein the data is signed with a private key;
accessing a disseminated public key associated with the user;
generating an equivalent hash by hashing the disseminated public key; and
confirming the identity of the user when the hash of the public key contained within the data matches the equivalent hash.

2. The computer-implemented method of claim 1, wherein the presence notification for the user that is published on the network is automatically published periodically while the user remains available on the network.

3. The computer-implemented method of claim 2, wherein the hash of the key received within the data is hashed with random data.

4. The computer-implemented method of claim 2, wherein the identify of the user is not confirmed when the timestamp indicates that a period of time has expired.

5. The computer-implemented method of claim 2, wherein the identify of the user is confirmed each time the presence notification is received.

6. The computer-implemented method of claim 1, wherein the user is confirmed to correspond to an entry in a contacts folder when the identity of the user is confirmed.

7. The computer-implemented method of claim 6, wherein rich content corresponding to the entry is displayed with a notification that the user is present on the network.

8. The computer-implemented method of claim 7, wherein the rich content includes at least one of a phone number, an address, and a picture corresponding to the nearby contact.

9. The computer-implemented method of claim 7, wherein the notification that the user is present on the network includes at least one of the display name, the sharing address, and an online status corresponding to the user.

10. A computer-readable storage medium that includes computer-executable instructions for identity confirmation of a user on a network, comprising:

receiving a presence notification of a user that indicates that the user is nearby on the network and is available; wherein the presence notification includes data that comprises a display name for the user; a sharing address for the user that resolves to a local machine address for the user; and a public key that is used to verify the identify of the user; wherein the data is signed with a private key;

accessing a first copy of the public key that is associated with the user;

determining whether the data published on the network that is signed with a private key associated with the public key includes a second copy of the public key; and confirming that the first copy of the public key and the second copy of the public key match so that the identity of the user is confirmed as the nearby contact.

11. The computer-readable storage medium of claim 10, wherein the identify of the user is not confirmed when a timestamp included within the data indicates that a period of time has expired.

12. The computer-readable medium of claim 10, wherein the second copy of the public key is hashed.

13. The computer-readable storage medium of claim 10, wherein the first copy of the public key is hashed for the comparison of the first copy of the public to the second copy of the public key, such that it is the hashed versions of the copies of the public key that are compared.

14. The computer-readable storage medium of claim 10, wherein the user is confirmed to correspond to an entry in a contacts folder when the identity of the user is confirmed.

15. The computer-readable storage medium of claim 14, wherein rich content corresponding to the entry is displayed with a notification that the user is present on the network.

16. The computer-readable storage medium of claim 15, wherein the rich content includes at least one of a phone number, an address, and a picture corresponding to the user.

17. The computer-readable medium of claim 15, wherein the notification that the user is present on the network includes a display name, a sharing address, and an online status corresponding to the user.

18. A system for identity confirmation of a user on a network, comprising:

a computing device that includes an application that is configured to:

receive a presence notification of a user that indicates that the user is nearby on the network and is available; wherein the presence notification includes data that comprises a display name for the user; and a public key that is used to verify the identify of the user;

access a copy of the public key associated with the user; and confirm that the copy of the public key is the key associated with the data in the presence notification to confirm the identify of the user.

19. The system of claim 18, wherein the data is signed with a private key, wherein the private key is associated with the public key that is included in data.

20. The system of claim 19, wherein the public key within the data is hashed.

21. The system of claim 19, wherein the data includes a timestamp that provides an interval of time that after the expiration of the interval of time the identify of the user is not confirmed.

22. The system of claim 19, wherein the public key is hashed with random data.

23. The system of claim 18, wherein the user is confirmed to correspond to an entry in a contacts folder when the identity of the user is confirmed as the nearby contact.

24. The system of claim 23, wherein rich content corresponding to the entry is displayed with a notification that the user is present on the network.

* * * * *